United States Patent
Zhu et al.

(10) Patent No.: US 9,846,298 B2
(45) Date of Patent: Dec. 19, 2017

(54) OFF-AXIS THREE-MIRROR OPTICAL SYSTEM WITH FREEFORM SURFACES

(71) Applicants: Tsinghua University, Beijing (CN); HON HAI PRECISION INDUSTRY CO., LTD., New Taipei (TW)

(72) Inventors: Jun Zhu, Beijing (CN); Tong Yang, Beijing (CN); Guo-Fan Jin, Beijing (CN); Shou-Shan Fan, Beijing (CN)

(73) Assignees: Tsinghua University, Beijing (CN); HON HAI PRECISION INDUSTRY CO., LTD., New Taipei (TW)

(*) Notice: Subject to any disclaimer, the term of this patent is extended or adjusted under 35 U.S.C. 154(b) by 0 days.

(21) Appl. No.: 15/244,205

(22) Filed: Aug. 23, 2016

(65) Prior Publication Data
US 2017/0285313 A1   Oct. 5, 2017

(30) Foreign Application Priority Data

Apr. 1, 2016   (CN) .......................... 2016 1 0199016

(51) Int. Cl.
| | | |
|---|---|---|
| *G02B 17/06* | (2006.01) | |
| *G02B 27/00* | (2006.01) | |
| *G02B 17/02* | (2006.01) | |
| *G02B 17/00* | (2006.01) | |

(52) U.S. Cl.
CPC ......... *G02B 17/0642* (2013.01); *G02B 17/00* (2013.01); *G02B 17/02* (2013.01); *G02B 17/06* (2013.01); *G02B 17/0626* (2013.01); *G02B 17/0694* (2013.01); *G02B 27/00* (2013.01); *G02B 27/0025* (2013.01)

(58) Field of Classification Search
CPC .......... G02B 17/0642; G02B 17/0626; G02B 17/06; G02B 17/02; G02B 17/00; G02B 17/0694; G02B 27/0025; G02B 27/00
USPC ........................................................ 359/366
See application file for complete search history.

(56) References Cited

U.S. PATENT DOCUMENTS

| | | | | |
|---|---|---|---|---|
| 4,265,510 | A * | 5/1981 | Cook ................. | G02B 17/0642 359/366 |
| 5,414,555 | A * | 5/1995 | Chan ................ | G01B 11/00 359/365 |
| 5,640,283 | A * | 6/1997 | Warren .............. | G02B 17/0642 359/366 |
| 5,763,882 | A * | 6/1998 | Klapper ............ | G02B 17/0652 250/332 |
| 6,016,220 | A * | 1/2000 | Cook ................. | G02B 17/0642 359/351 |

(Continued)

Primary Examiner — William R Alexander
(74) Attorney, Agent, or Firm — ScienBiziP, P.C.

(57) ABSTRACT

An off-axis three-mirror optical system with freeform surfaces comprised an aperture, a primary mirror, a secondary mirror, a tertiary mirror, and a detector. The aperture is located on an incident light path. The primary mirror is located on an aperture side. The secondary mirror is located on a primary mirror reflected light path. The tertiary mirror is located on a secondary mirror reflected light path. The detector located on a tertiary mirror reflected light path. The primary mirror and the tertiary mirror have a same fifth-order polynomial freeform surface expression. The primary mirror reflected light path, the secondary mirror reflected light path and the tertiary mirror reflected light path overlap with each other.

18 Claims, 3 Drawing Sheets

(56) References Cited

U.S. PATENT DOCUMENTS

| | | | |
|---|---|---|---|
| 6,426,834 B1* | 7/2002 | Braunecker | G02B 17/0832 359/366 |
| 2012/0038812 A1* | 2/2012 | Neil | G02B 17/0636 348/340 |
| 2013/0188246 A1* | 7/2013 | Rogalsky | G02B 17/0663 359/351 |
| 2014/0124649 A1* | 5/2014 | Hou | G02B 17/0621 250/208.1 |
| 2014/0124657 A1* | 5/2014 | Zhu | G02B 17/0621 250/216 |
| 2014/0240820 A1* | 8/2014 | Sitter, Jr. | G02B 13/146 359/351 |
| 2015/0253552 A1* | 9/2015 | Zhu | G01J 1/0414 250/216 |
| 2015/0253553 A1* | 9/2015 | Zhu | G01J 1/42 356/445 |
| 2015/0346022 A1* | 12/2015 | Yang | G02B 17/0642 250/216 |
| 2015/0346468 A1* | 12/2015 | Zhu | G02B 17/0642 250/216 |
| 2016/0170191 A1* | 6/2016 | Hou | G02B 17/0626 359/858 |

* cited by examiner

OFF-AXIS THREE-MIRROR OPTICAL SYSTEM WITH FREEFORM SURFACES

CROSS-REFERENCE TO RELATED APPLICATIONS

This application is a continuation application in part of U.S. patent application Ser. No. 15/168,340, filed on May 31, 2016, and entitled, "OFF-AXIS THREE-MIRROR OPTICAL SYSTEM WITH FREEFORM SURFACES," which claims all benefits accruing under 35 U.S.C. §119 from China Patent Application No. 201610199016.9, field on Apr. 1, 2016 in the China Intellectual Property Office, disclosure of which is incorporated herein by reference.

FIELD

The present disclosure relates to an off-axis optical system.

BACKGROUND

Off-axis three-mirror imaging system is a kind of off-axis reflective system. If freeform surfaces are used in off-axis three-mirror imaging systems, the aberrations of the system can be significantly reduced, while the system specifications can be greatly improved.

In conventional off-axis three-mirror optical system with freeform surfaces, the three mirrors are separated in space and they have different freeform surface analytical expressions. If the primary and tertiary mirrors share a same freeform surface expression and are fabricated on a single substrate, the difficulty of system alignment and fabrication as well as the cost for the testing of the system can be reduced.

However, since the primary mirror and the tertiary mirror are located generally far away from each other on a single element in this kind of system, a size of the conventional off-axis three-mirror optical system with freeform surfaces is large, and a structure of the conventional off-axis three-mirror optical system with freeform surfaces is not compact. In addition, a volume of the single element is large, therefore the surface sag at the edge of the surface is large, which increases the difficulty for fabrication and testing.

BRIEF DESCRIPTION OF THE DRAWINGS

Implementations of the present technology will now be described, by way of example only, with reference to the attached figures.

DETAILED DESCRIPTION

Figure 1:
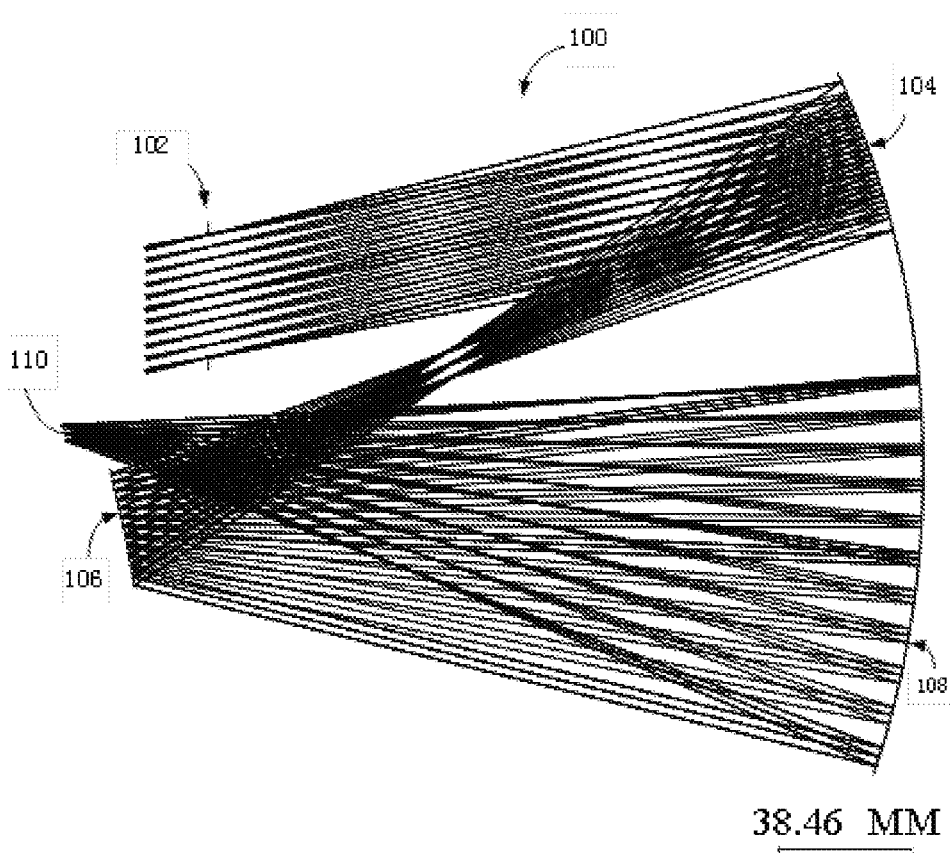
FIG. 1 is a schematic view of a light path of an off-axis three-mirror optical system with freeform surfaces according to one embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

Figure 2:
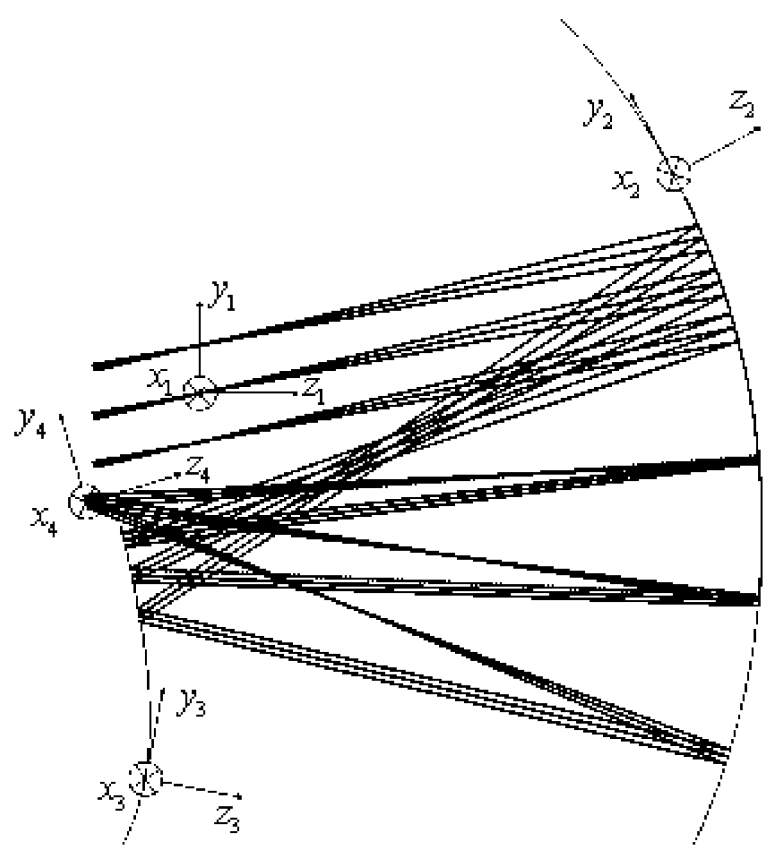
FIG. 2 is a schematic view of a configuration of an off-axis three-mirror optical system with freeform surfaces according to one embodiment.

FIGS. 1 and 2 illustrate one embodiment of an off-axis three-mirror optical system with freeform surfaces 100 includes an aperture 102, a primary mirror 104, a secondary mirror 106, a tertiary mirror 108, and a detector 110. The aperture 102 is used to control a diameter of incident lights. The primary mirror 104 is located on an aperture side that is away from an object space. The secondary mirror 106 is located on a primary mirror reflected light path. The tertiary mirror 108 is located on a secondary mirror reflected light path. The detector 110 is located on a tertiary mirror reflected light path. A primary mirror reflective surface, a secondary mirror reflective surface and a tertiary mirror reflective surface are all freeform surfaces.

A light path of the off-axis three-mirror optical system with freeform surfaces 100 can be depicted as follows. Firstly, incident light transmits through the aperture 102 and reach the primary mirror 104, and is reflected by the primary mirror 104 to form a first reflected light $R_1$. Secondly, the first reflected light $R_1$ reaches the secondary mirror 106, and is reflected by the secondary mirror 106 to form a second reflected light $R_2$. Thirdly, the second reflected light $R_2$ reaches the tertiary mirror 108, and is reflected by the tertiary mirror 108 to form a third reflected light $R_3$. Finally, the third reflected light $R_3$ is received by the detector 110 and imaging. The primary mirror reflected light path, the secondary mirror reflected light path and the tertiary mirror reflected light path overlap with each other. Therefore, a volume of the off-axis three-mirror optical system with freeform surfaces 100 is small, and a structure of the off-axis three-mirror optical system with freeform surfaces 100 is compact.

A first three-dimensional rectangular coordinates system $(x_1, y_1, z_1)$ is defined. A center of the aperture 102 is a first origin of the first three-dimensional rectangular coordinates system $(x_1, y_1, z_1)$. A horizontal line passing through the center of the aperture 102 is defined as a $z_1$-axis, in the $z_1$-axis, to the left is negative, and to the right is positive. A $y_1$-axis is in a plane shown in FIG. 2, in the $y_1$-axis, in a direction substantially perpendicular to the $z_1$-axis, to the upward is positive, and to the downward is negative. An $x_1$-axis is perpendicular to a $y_1z_1$ plane, in the $x_1$-axis, in a direction substantially perpendicular to the $y_1z_1$ plane, to the inside is positive, and to the outside is negative. A second three-dimensional rectangular coordinates system ($x_2$, $y_2$, $z_2$) is defined for a primary mirror location and a tertiary mirror location. A third three-dimensional rectangular coordinates system ($x_3$, $y_3$, $z_3$) is defined for a secondary mirror location. A fourth three-dimensional rectangular coordinates system ($x_4$, $y_4$, $z_4$) is defined for a detector location.

A second origin of the second three-dimensional rectangular coordinates system ($x_2$, $y_2$, $z_2$) is in (0, 88.59727, 198.07169) position of the first three-dimensional rectangular coordinates system ($x_1$, $y_1$, $z_1$), whose unit is millimeter. A $z_2$-axis positive direction rotates about 27.84258 degrees along a counterclockwise direction relative to a $z_1$-axis positive direction.

A third origin of the third three-dimensional rectangular coordinates system ($x_3$, $y_3$, $z_3$) is in (0, −159.26851, −22.49695) position of the first three-dimensional rectangular coordinates system ($x_1$, $y_1$, $z_1$), whose unit is millimeter. A $z_3$-axis positive direction rotates about 10.80811 degrees along a clockwise direction relative to the $z_1$-axis positive direction.

A fourth origin of the fourth three-dimensional rectangular coordinates system ($x_3$, $y_3$, $z_3$) is in (0, −44.59531, −47.02867) position of the first three-dimensional rectangular coordinates system ($x_1$, $y_1$, $z_1$), whose unit is millimeter. A $z_4$-axis positive direction rotates about 16.28528 degrees along the counterclockwise direction relative to the $z_1$-axis positive direction.

In the second three-dimensional rectangular coordinates system ($x_2$, $y_2$, $z_2$), each of the primary mirror reflective surface and the tertiary mirror reflective surface is a fifth-order polynomial of $x_2 y_2$. The fifth-order polynomial of $x_2 y_2$ can be expressed as follows:

$$z_2(x_2, y_2) = \frac{c(x_2^2 + y_2^2)}{1 + \sqrt{1-(1+k)c^2(x_2^2+y_2^2)}} + A_2 y_2 + A_3 x_2^2 + A_5 y_2^2 + A_7 x_2^2 y_2 + A_9 y_2^3 + A_{10} x_2^4 + A_{12} x_2^2 y_2^2 + A_{14} y_2^4 + A_{16} x_2^4 y_2 + A_{18} x_2^2 y_2^3 + A_{20} y_2^5.$$

In the fifth-order polynomial of $x_2 y_2$, z represents surface sag, c represents surface curvature, k represents conic constant, while $A_i$ represents the ith term coefficient. Since the off-axis three-mirror optical system with freeform surfaces 100 is symmetrical about $y_2 z_2$ plane, even-order terms of $x_2$ can be only remained. In one embodiment, the values of c, k, and $A_i$ in the equation of the fifth-order polynomial of $x_2 y_2$ are listed in TABLE 1. However, the values of c, k, and $A_i$ in the fifth-order polynomial of $x_2 y_2$ are not limited to TABLE 1.

TABLE 1

| | |
|---|---|
| c | −3.27428849555454E−03 |
| k | −1.61056781473286E−02 |
| $A_2$ | 0 |
| $A_3$ | 1.77940950627604E−05 |
| $A_5$ | −1.77940950627604E−05 |
| $A_7$ | −4.97702713232211E−07 |
| $A_9$ | −4.30829450386771E−07 |
| $A_{10}$ | 7.37848373012176E−11 |
| $A_{12}$ | −2.76033854073487E−09 |
| $A_{14}$ | −1.52054141847422E−09 |
| $A_{16}$ | −1.46969502769919E−12 |
| $A_{18}$ | −7.85854145063803E−12 |
| $A_{20}$ | −3.08644833572915E−12 |

In the third three-dimensional rectangular coordinates system ($x_3$, $y_3$, $z_3$), the secondary mirror reflective surface is a fifth-order polynomial of $x_3 y_3$. The fifth-order polynomial of $x_3 y_3$ can be expressed as follows:

$$z_3(x_3, y_3) = \frac{c(x_3^2 + y_3^2)}{1 + \sqrt{1-(1+k)c^2(x_3^2+y_3^2)}} + A_2 y_3 + A_3 x_3^2 + A_5 y_3^2 + A_7 x_3^2 y_3 + A_9 y_3^3 + A_{10} x_3^4 + A_{12} x_3^2 y_3^2 + A_{14} y_3^4 + A_{16} x_3^4 y_3 + A_{18} x_3^2 y_3^3 + A_{20} y_3^5.$$

In the fifth-order polynomial of $x_3 y_3$, $z_3$ represents surface sag, c represents surface curvature, k represents conic constant, while $A_i$ represents the ith term coefficient. Since the off-axis three-mirror optical system with freeform surfaces 100 is symmetrical about $y_3 z_3$ plane, even-order terms of $x_3$ can be only remained. In one embodiment, the values of c, k, and $A_i$ in the fifth-order polynomial of $x_3 y_3$ are listed in TABLE 2. However, the values of c, k, and $A_i$ in the fifth-order polynomial of $x_3 y_3$ are not limited to TABLE 2.

TABLE 2

| | |
|---|---|
| c | −6.00151426486546E−03 |
| k | −9.00757350823094E−01 |
| $A_2$ | 0 |
| $A_3$ | 1.53297133632194E−03 |
| $A_5$ | −1.53297133632194E−03 |
| $A_7$ | 1.11944340338599E−05 |
| $A_9$ | 1.75716927381476E−05 |
| $A_{10}$ | −6.21792185006774E−08 |
| $A_{12}$ | 6.60508108627770E−08 |
| $A_{14}$ | 4.11464902821164E−09 |
| $A_{16}$ | 2.02500935896665E−10 |
| $A_{18}$ | −7.66867334384602E−10 |
| $A_{20}$ | −1.54693948011218E−10 |

A center of the detector 110 is the fourth origin of the fourth three-dimensional rectangular coordinates system ($X_3$, $Y_3$, $Z_3$). the detector 110 is in a plane of the fourth three-dimensional rectangular coordinates system ($X_4$, $Y_4$, $Z_4$).

The materials of the primary mirror 104, the secondary mirror 106 and the tertiary mirror 108 can be aluminum, beryllium or other metals. The materials of the primary mirror 104, the secondary mirror 106 and the tertiary mirror 108 can also be silicon carbide, quartz or other inorganic materials. A reflection enhancing coating can also be coated on the metals or inorganic materials to enhance the reflectivity performance of the three mirrors. In one embodiment, the reflection enhancing coating is a gold film.

An effective entrance pupil diameter of the off-axis three-mirror optical system with freeform surfaces is about 40 mm.

The off-axis three-mirror optical system with freeform surfaces 100 adopts an off-axis field of view in a vertical direction. A field angle of the off-axis three-mirror optical system with freeform surfaces 100 is about 4°×3°, wherein an angle in a horizontal direction is in a range from about −2° to about 2°, and an angle in the vertical direction is in a range from about 10.5° to about 13.5°.

A wavelength of the off-axis three-mirror optical system with freeform surfaces 100 is not limited, in one embodiment, the wavelength of the off-axis three-mirror optical system with freeform surfaces 100 is in a range from about 8 μm to about 12 μm.

An effective focal length (EFL) of the off-axis three-mirror optical system with freeform surfaces 100 is about 100 mm.

A relative aperture (D/f) of the off-axis three-mirror optical system with freeform surfaces 100 is about 0.4; and a F-number of the off-axis three-mirror optical system with freeform surfaces 100 is a relative aperture(D/f) reciprocal, the F-number is about 2.5.

Figure 3:
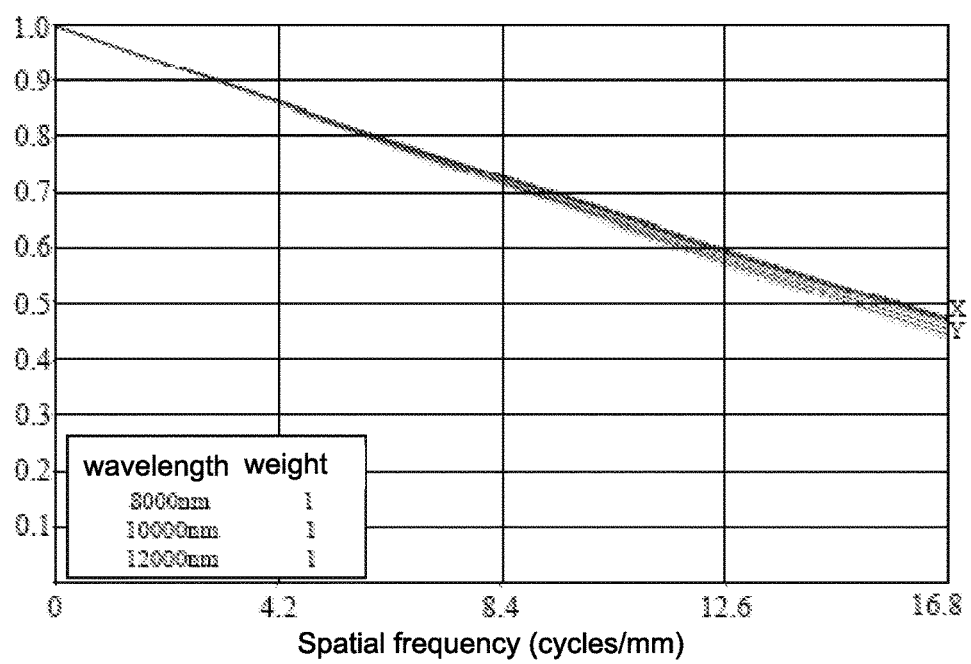
FIG. 3 is a graph showing modulation transfer function curves in long-wave infrared band of partial field angles of an off-axis three-mirror optical system with freeform surfaces according to one embodiment.

FIG. 3 illustrates off-axis three-mirror optical system with freeform surfaces modulation transfer functions (MTF) in long-wave infrared band of partial field angles are close to the diffraction limit. It shows that an off-axis three-mirror optical system with freeform surfaces imaging quality is high.

The off-axis three-mirror optical system with freeform surfaces 100 has advantages as follows:

The off-axis three-mirror optical system with freeform surfaces 100 has larger field angle compared with coaxial three-mirror optical systems, the field angle is about 4°×3°; thereby enabling the off-axis three-mirror optical system with freeform surfaces 100 has larger rectangular field of view, and larger imaging range.

The primary mirror reflective surface, the secondary mirror reflective surface and the tertiary mirror reflective surface are all freeform surfaces, compared with spherical or aspherical system, the off-axis three-mirror optical system with freeform surfaces 100 has more variables, which is beneficial for correcting aberrations, and obtaining better imaging quality.

The off-axis three-mirror optical system with freeform surfaces 100 has smaller F-number and larger relative aperture, which allows more lights to enter the off-axis three-mirror optical system with freeform surfaces 100, and enables the off-axis three-mirror optical system with freeform surfaces 100 has higher input energy and limiting resolution.

Since the primary mirror surface and the tertiary mirror surface use the same freeform surface equation, it is no need to transform coordinate system and surface expressions when fabrication the off-axis three-mirror optical system with freeform surfaces 100, and the primary mirror and the tertiary mirror can be fabricated on a single element; thereby reducing fabrication difficulty.

A space position of the primary mirror is close to a space position of the tertiary mirror, a volume of a primary mirror—tertiary mirror element is small, and thus, the sag at the edge of the is small, which can reduce the fabrication difficulty.

Testing of the primary mirror and the tertiary mirror can only use a computer-generated hologram (CGH) component, which can simplify a testing process and reduce costs.

The primary mirror reflected light path, the secondary mirror reflected light path and the tertiary mirror reflected light path overlap with each other. Therefore, the volume of the off-axis three-mirror optical system with freeform surfaces 100 is small, and the structure of the off-axis three-mirror optical system with freeform surfaces 100 is compact.

It is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

What is claimed is:

1. An off-axis three-mirror optical system with freeform surfaces comprising:
    an aperture located on an incident light path, and the aperture defining an aperture center;
    a primary mirror located on an aperture side that is away from an object space and configured to reflect an incident light to form a first reflected light, and the first reflected light defining a first reflected light path;
    a secondary mirror located on the first reflected light path and configured to reflect the first reflected light to form a second reflected light, and the second reflected light defining a second reflected light path;
    a tertiary mirror located on the second reflected light path and configured to reflect the second reflected light to form a third reflected light, and the third reflected light defining a third reflected light path; and
    a detector located on the third reflected light path and configured to receive the third reflected light;
    wherein a first three-dimensional rectangular coordinates system $(x_1, y_1, z_1)$ is defined, and the aperture center is a first three-dimensional rectangular coordinates system $(x_1, y_1, z_1)$ origin; a second three-dimensional rectangular coordinates system $(x_2, y_2, z_2)$ is defined for a primary mirror location and a tertiary mirror location; a third three-dimensional rectangular coordinates system $(x_3, y_3, z_3)$ is defined for a secondary mirror location; and a fourth three-dimensional rectangular coordinates system $(x_4, y_4, z_4)$ is defined for a detector location;
    a primary mirror reflective surface and a tertiary mirror reflective surface have a same freeform surface analytical expression, and the freeform surface equation is a fifth-order polynomial of $x_2 y_2$; a secondary mirror reflective surface is a fifth-order polynomial of $x_3 y_3$; and the first reflected light path, the second reflected light path and the third reflected light path overlap with each other.

2. The system as claimed in claim 1, wherein a second three-dimensional rectangular coordinates system $(x_2, y_2, z_2)$ origin is in (0, 88.59727, 198.07169) position of the first three-dimensional rectangular coordinates system $(x_1, y_1, z_1)$.

3. The system as claimed in claim 1, wherein a $z_2$-axis positive direction rotates 27.84258 degrees along a counter-clockwise direction relative to a $z_1$-axis positive direction.

4. The system as claimed in claim 1, wherein a third three-dimensional rectangular coordinates system $(x_3, y_3, z_3)$ origin is in (0, −159.26851, −22.49695) position of the first three-dimensional rectangular coordinates system $(x_1, y_1, z_1)$.

5. The system as claimed in claim 1, wherein a $z_3$-axis positive direction rotates 10.80811 degrees along a clockwise direction relative to a $z_1$-axis positive direction.

6. The system as claimed in claim 1, wherein a fourth three-dimensional rectangular coordinates system $(x_4, y_4, z_4)$ origin is in (0, −44.59531, −47.02867) position of the first three-dimensional rectangular coordinates system $(x_1, y_1, z_1)$.

7. The system as claimed in claim 1, wherein a $z_4$-axis positive direction rotates 16.28528 degrees along a counter-clockwise direction relative to a $z_1$-axis positive direction.

8. The system as claimed in claim 1, wherein the fifth-order polynomial of $x_2 y_2$ is:

$$z_2(x_2, y_2) = \frac{c(x_2^2 + y_2^2)}{1 + \sqrt{1-(1+k)c^2(x_2^2+y_2^2)}} + A_2 y_2 + A_3 x_2^2 + A_5 y_2^2 + A_7 x_2^2 y_2 +$$
$$A_9 y_2^3 + A_{10} x_2^4 + A_{12} x_2^2 y_2^2 + A_{14} y_2^4 + A_{16} x_2^4 y_2 + A_{18} x_2^2 y_2^3 + A_{20} y_2^5,$$

wherein, z represents surface sag, c represents surface curvature, k represents conic constant, while $A_i$ represents the ith term coefficient.

9. The system as claimed in claim 8, wherein c=−3.27428849555454E-03, k=−1.61056781473286E-02, $A_2$=0, $A_3$=1.77940950627604E-05, $A_5$=−1.77940950627604E-05, $A_7$=−4.97702713232211E-07, $A_9$=−4.30829450386771E-07, $A_{10}$=7.37848373012176E-11, $A_{12}$=−2.76033854073487E-09, $A_{14}$=−1.52054141847422E-09, $A_{16}$=−1.46969502769919E-12, $A_{18}$=−7.85854145063803E-12, and $A_{20}$=−3.08644833572915E-12.

10. The system as claimed in claim 1, wherein the fifth-order polynomial of $x_3 y_3$ is:

$$z_3(x_3, y_3) = \frac{c(x_3^2 + y_3^2)}{1 + \sqrt{1-(1+k)c^2(x_3^2+y_3^2)}} + A_2 y_3 + A_3 x_3^2 + A_5 y_3^2 + A_7 x_3^2 y_3 +$$
$$A_9 y_3^3 + A_{10} x_3^4 + A_{12} x_3^2 y_3^2 + A_{14} y_3^4 + A_{16} x_3^4 y_3 + A_{18} x_3^2 y_3^3 + A_{20} y_3^5,$$

wherein, $z_3$ represents surface sag, c represents surface curvature, k represents conic constant, while $A_i$ represents the ith term coefficient.

11. The system as claimed in claim 10, wherein c=−6.00151426486546E-03, k=−9.00757350823094E-01, $A_2$=0, $A_3$=1.53297133632194E-03, $A_5$=−1.53297133632194E-03, $A_7$=1.11944340338599E-05, $A_9$=1.75716927381476E-05, $A_{10}$=−6.21792185006774E-08, $A_{12}$=6.60508108627770E-08, $A_{14}$=4.11464902821164E-09, $A_{16}$=2.02500935896665E-10, $A_{18}$=−7.66867334384602E-10, and $A_{20}$=−1.54693948011218E-10.

12. The system as claimed in claim 1, wherein a field angle of the off-axis three-mirror optical system with freeform surfaces is about 4°×3°.

13. The system as claimed in claim 12, wherein an angle in a horizontal direction is in a range from −2°×2°.

14. The system as claimed in claim 12, wherein an angle in a vertical direction is in a range from 10.5° to 13.5°.

15. The system as claimed in claim 1, wherein a relative aperture of the off-axis three-mirror optical system with freeform surfaces is 0.4; and an F-number is 2.5.

16. The system as claimed in claim 1, wherein an effective entrance pupil diameter of the off-axis three-mirror optical system with freeform surfaces is 40 mm.

17. The system as claimed in claim 1, wherein an effective focal length of the off-axis three-mirror optical system with freeform surfaces is about 100 mm.

18. An off-axis three-mirror optical system with freeform surfaces comprising:
an aperture located on an incident light path;
a primary mirror located on an aperture side that is away from an object space;
a secondary mirror located on a primary mirror reflected light path;
a tertiary mirror located on a secondary mirror reflected light path; and
a detector located on a tertiary mirror reflected light path;
wherein a primary mirror surface and a tertiary mirror surface have a same freeform surface analytical expression; and the primary mirror reflected light path, the secondary mirror reflected light path and the tertiary mirror reflected light path overlap with each other.

* * * * *